US008436102B2

(12) United States Patent
Hashimoto et al.

(10) Patent No.: US 8,436,102 B2
(45) Date of Patent: May 7, 2013

(54) POLYCHLOROPRENE LATEX COMPOSITION, PROCESS FOR PRODUCTION OF SAME, AND PRODUCTS OF FORMING THEREOF

(75) Inventors: Ikuka Hashimoto, Itoigawa (JP); Misaki Tada, Itoigawa (JP); Kosuke Watanabe, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/379,580

(22) PCT Filed: Jul. 6, 2010

(86) PCT No.: PCT/JP2010/061441
§ 371 (c)(1), (2), (4) Date: Dec. 20, 2011

(87) PCT Pub. No.: WO2011/004805
PCT Pub. Date: Jan. 13, 2011

(65) Prior Publication Data

US 2012/0108744 A1 May 3, 2012

(30) Foreign Application Priority Data

Jul. 6, 2009 (JP) ................................ 2009-159655

(51) Int. Cl.
*C08F 236/18* (2006.01)

(52) U.S. Cl.
USPC ............................ 525/250; 525/261; 264/305

(58) Field of Classification Search .................. 524/162, 524/273, 274; 525/250, 258, 261
See application file for complete search history.

(56) References Cited

U.S. PATENT DOCUMENTS 6,451,893 B1 9/2002 Tao

FOREIGN PATENT DOCUMENTS

| | | | |
|---|---|---|---|
| JP | 2000-198881 | A | 7/2000 |
| JP | 2003-041410 | A | 2/2003 |
| JP | 2006-199933 | A | 8/2006 |
| JP | 2006-219546 | A | 8/2006 |
| JP | 2007-106994 | A | 4/2007 |
| JP | 2008-231404 | A | 10/2008 |
| JP | 2009-191182 | A | 8/2009 |
| WO | 03/042314 | A1 | 5/2003 |
| WO | 2008026429 | A1 | 3/2008 |

OTHER PUBLICATIONS

International Search Report of International Application No. PCT/JP2010/061441.

*Primary Examiner* — Peter Szekely
(74) *Attorney, Agent, or Firm* — Roberts Mlotkowski Safran & Cole P.C.

(57) ABSTRACT

Provided are a polychloroprene latex composition giving immersion-molded articles superior in releasability from the mold during immersion molding and also superior in flexibility, a production method thereof and a molded article prepared by using the same.

A polychloroprene latex composition containing an alkyldiphenyletherdisulfonic acid alkali-metal salt in an amount of 0.01 to 1.0 part by mass with respect to 100 parts by mass of a polychloroprene latex is prepared by emulsion polymerization of the monomer in the presence of a rosin acid alkali-metal salt and an alkyldiphenyletherdisulfonic acid alkali-metal salt each in an amount of 3 parts or less by mass with respect to 100 parts by mass of the monomer.

8 Claims, No Drawings

POLYCHLOROPRENE LATEX COMPOSITION, PROCESS FOR PRODUCTION OF SAME, AND PRODUCTS OF FORMING THEREOF

TECHNICAL FIELD

The present invention relates to a polychloroprene latex composition, a production method thereof and a molded article prepared by using the same. In particular, it relates to a polychloroprene latex composition for use in immersion molding, a production method thereof and a molded article prepared by immersion molding the same.

BACKGROUND ART

Polychloroprene latexes, which are superior in various properties such as mechanical strength, weather resistance, heat resistance and chemical resistance, have been used widely in the fields of materials for immersion-molded articles such as gloves, textile processing agents, paper-processing agents, bonding/adhesive agents, elastic asphalts (modified asphalts) and elastic cements.

Generally, natural rubbers have been used as the materials for immersion-molded articles such as gloves. However, natural rubbers contain proteins causing allergic symptoms and use of them on materials that come into direct contact with the skin may cause symptoms such as urticaria and rash. This problem is particularly important in the medical field and disposal medical gloves such as those used for operation demand a material that does not cause such allergic symptoms.

Developed to solve the problem above, were protein-free natural rubber latexes (see, for example, Patent Document 1). In the case of the protein-free natural rubber latexes described in Patent Document 1, ketones were added to the rubber to compensate for the decrease in strength due to deproteination. Also proposed were gloves made of a material other than natural rubbers such as polychloroprene or nitrile butadiene rubber latex (see, for example, Patent Documents 2 and 3).

Citation List

Patent Documents

[Patent Document 1] Japanese Unexamined Patent Aplication Publication No. 2000-198881

[Patent Document 2] Japanese Unexamined Patent Aplication Publication No. 2003-41410

[Patent Document 3] Japanese Unexamined Patent Aplication Publication JP-A No. 2007-106994

SUMMARY OF INVENTION

Technical Problem

However, the prior art described above has the following problems. Specifically, the deproteinated natural rubber latex described in Patent Document 1 has a problem that it demands a step of deproteinating the natural rubber and also, that it does not provide sufficient mechanical strength, even if ketones are added thereto. On the other hand, the nitrile butadiene rubber latex described in Patent Document 2 has a problems that it give an immersion-molded article harder in texture that is difficult to be used for a long period, especially when it is used on gloves.

On the other hand, polychloroprene latexes have a problem that they are inferior in flexibility and stability over time and, although improvement in these properties was attempted in Patent Document 3, the improvement is still insufficient. The polychloroprene latexes also have a problem that they are less easily separated from the mold during immersion molding.

Accordingly, it is a main object of the present invention to provide a polychloroprene latex composition giving an immersion-molded article superior in releasability from the mold during immersion molding and also superior in flexibility, a production method thereof and a molded article prepared by using the same.

Solution to Problem

The polychloroprene latex composition according to the present invention contains 100 parts by mass of a polychloroprene latex obtained by emulsion polymerization in the presence of a rosin acid alkali-metal salt in an amount of 3 parts or less by mass with respect to 100 parts by mass of the monomer and 0.01 to 1.0 part by mass of an alkyldiphenyletherdisulfonic acid alkali-metal salt.

The composition may contain 2,3-dichloro-1,3-butadiene in an amount of 1 to 30 mass % in 100 parts by mass of the monomer.

In a method of producing a polychloroprene latex composition according to the present invention, a polychloroprene latex containing an alkyldiphenyletherdisulfonic acid alkali-metal salt in an amount of 0.01 to 1.0 part by mass with respect to 100 parts by mass of the polychloroprene latex is obtained by emulsion polymerization of the monomer in the presence of a rosin acid alkali-metal salt and the alkyldiphenyletherdisulfonic acid alkali-metal salt each in an amount of 3 parts or less by mass with respect to 100 parts by mass of the monomer.

In another method of producing a polychloroprene latex composition according to the present invention, the monomer is emulsion-polymerized by using a rosin acid alkali-metal salt in an amount of 3 parts or less by mass with respect to 100 parts by mass of the monomer as emulsifier and an alkyldiphenyletherdisulfonic acid alkali-metal salt in an amount of 0.01 to 1.0 part by mass with respect to 100 parts by mass of the polychloroprene latex is added thereto.

In these production methods, the alkyldiphenyletherdisulfonic acid alkali-metal salt may be added after emulsion polymerization of the monomer using a rosin acid alkali-metal salt as emulsifier.

Alternatively, the emulsion polymerization may be initiated with the initial addition amount of the monomer adjusted to 10 to 50 mass % of the total monomer and the remaining monomer, which is cooled to a temperature lower than the polymerization temperature, be added to the polymerization system continuously during the period from the time when the monomer conversion rate is 1 to 40% to the time when the polymerization reaches a final polymerization conversion rate.

The molded article according to the present invention is an article obtained by immersion molding with the polychloroprene latex composition described above, and an example thereof is gloves.

Advantageous Effects of Invention

It is possible according to the present invention to improve releasability of a molded article from a mold during immersion molding and to obtain an immersion-molded article superior in flexibility.

DESCRIPTION OF EMBODIMENTS

Hereinafter, favorable embodiments of the invention will be described in detail. However, it should be understood that the present invention is not limited to the embodiments below.

The polychloroprene latex composition (hereinafter, also referred to simply as composition) in an embodiment of the present invention contains an alkyldiphenyletherdisulfonic acid alkali-metal salt in an amount of 0.01 to 1.0 part by mass with respect to 100 parts by mass of the polychloroprene latex.

[Polychloroprene Latex]

A polychloroprene latex is the major component of the polychloroprene latex composition in this embodiment. However, use of a polychloroprene latex obtained by emulsion polymerization in the presence of a rosin acid alkali-metal salt in an amount of more than 3 parts by mass with respect to 100 parts by mass of the monomer leads to easier adhesion of the obtained immersion-molded articles (films) to each other and thus to deterioration in easiness in handling. Thus, the composition in the present embodiment uses a polychloroprene latex obtained by emulsion polymerization in the presence of a rosin acid alkali-metal salt in an amount of 3 parts or less by mass with respect to 100 parts by mass of the monomer.

In addition, the polychloroprene latex blended to the composition in the present embodiment preferably contains 2,3-dichloro-1,3-butadiene in an amount of 1 to 30 mass % with respect to 100 parts by mass of the monomer to be emulsion-polymerized. It is possible in this way to improve crystallization resistance and flexibility of the molded article.

[Alkyldiphenyletherdisulfonic Acid Alkali-Metal Salt]

The alkyldiphenyletherdisulfonic acid alkali-metal salt is added for reduction of insufficient emulsification and aggregation of the polychloroprene latex and thus for production of a uniform immersion-molded article. Thus in the composition in the present embodiment, the content of the alkyldiphenyletherdisulfonic acid alkali-metal salt is 0.01 to 1.0 part by mass with respect to 100 parts by mass of the polychloroprene latex.

When the content of the alkyldiphenyletherdisulfonic acid alkali-metal salt is less than 0.01 part by mass with respect to 100 parts by mass of the polychloroprene latex, it is not possible to obtain the action to reduce insufficient emulsification and aggregation described above sufficiently. Alternatively when the content of the alkyldiphenyletherdisulfonic acid alkali-metal salt is more than 1.0 part by mass, it is not possible to improve the coagulability of the latex, prohibiting production of a uniform immersion-molded article.

The polychloroprene latex composition described above is obtained by emulsion polymerization of the monomer in the presence of a rosin acid alkali-metal salt and an alkyldiphenyletherdisulfonic acid alkali-metal salt or by emulsion polymerization of the monomer in the presence of a rosin acid alkali-metal salt and subsequent addition of an alkyldiphenyletherdisulfonic acid alkali-metal salt.

For example if an alkyldiphenyletherdisulfonic acid alkali-metal salt is added after emulsion polymerization of the monomer in the presence of a rosin acid alkali-metal salt, chloroprene is first emulsion-polymerized, to give a polychloroprene latex. Specifically, chloroprene alone or a mixture of chloroprene and monomers copolymerizable with chloroprene is emulsion-polymerized with an added polymerization initiator and a chain-transfer agent in the presence of an emulsifier/dispersant and, when the reaction reaches a desirable polymerization conversion rate, a polymerization terminator is added for termination of the polymerization. Chloroprene is specifically 2-chloro-1,3-butadiene.

The monomer copolymerizable with chloroprene is copolymerized with chloroprene for adjustment of the properties of the polychloroprene latex obtained, and examples thereof for use include acrylic esters such as methyl acrylate, butyl acrylate and 2-ethylhexyl acrylate; methacrylic esters such as methyl methacrylate, butyl methacrylate and 2-ethylhexyl methacrylate; hydroxy (meth)acrylates such as 2-hydroxyethyl (meth)acrylate, 2-hydroxymethyl (meth)acrylate and 2-hydroxypropyl (meth)acrylate; 2,3-dichloro-1,3-butadiene, 1-chloro-1,3-butadiene, butadiene, isoprene, ethylene, styrene, acrylonitrile and the like. These comonomers can be used alone or in combination of two or more, as needed.

In particular among the monomers above, 2,3-dichloro-1,3-butadiene is preferably used as the monomer for copolymerization with chloroprene, because it is favorably copolymerizable with chloroprene and provides a product with favorable properties such as favorable crystallization resistance and flexibility. When 2,3-dichloro-1,3-butadiene is copolymerized, the content of the 2,3-dichloro-1,3-butadiene in all monomers is preferably 1 to 30 mass %, more preferably 5 to 20 mass %. When the content of 2,3-dichloro-1,3-butadiene in all monomers is less than 1 mass %, it may not be possible to obtain favorable improvement in crystallization resistance. When it is more than 30 mass %, the polymer may crystallize in excess, leading to deterioration in flexibility.

The emulsifier/dispersant used in emulsion polymerization may be any common rosin acid alkali-metal salt. In particular, use of the sodium and/or potassium salt of a disproportionated rosin acid is preferable from the viewpoint of discoloration resistance. The amount of the rosin acid alkali-metal salt used in emulsion polymerization is 3 parts or less by mass with respect to 100 parts by mass of the monomer. When the amount of the rosin acid alkali-metal salt is more than 3 parts by mass, the polychloroprene latex becomes more adhesive because of residual rosin acid, leading to generation of molding defects by adhesion to a mold during immersion molding and increase in stickiness of a surface of a immersion-molded article obtained.

A compound having a structure other than that of the rosin acid alkali-metal salt may be used as the emulsifier/dispersant, if it does not impair the advantageous effects of the invention. The emulsifier/dispersant usable with the rosin acid alkali-metal salt is for example a carboxylic acid-type, sulfonic acid-type or sulfate ester-type emulsifier/dispersant, and examples thereof include, but are not limited to, alkyl sulfonates and alkylallyl sulfonates having a carbon number of 8 to 20, condensates of sodium naphthalenesulfonate and formaldehyde, polyoxyethylene acyl ethers, polyoxyethylene alkylphenols, sorbitan fatty acid esters, polyoxyethylene acyl esters and the like.

The polymerization initiator used in emulsion polymerization is not particularly limited and any one of those commonly used for emulsion polymerization of chloroprene may be used. Specifically, persulfate salts such as potassium persulfate and organic peroxides such as tertiary-butyl hydroperoxide are used favorably.

The chain-transfer agent is also not particularly limited, and any one of those commonly used for emulsion polymerization of chloroprene can be used. Specifically, known chain-transfer agents including long-chain alkylmercaptans such as n-dodecylmercaptan and tert-dodecylmercaptan, dialkylxanthic disulfides such as diisopropylxanthic disulfide and diethylxanthic disulfide and iodoform can be used.

On the other hand, the polymerization temperature of the chloroprene latex is not particularly limited and generally can be in the range where emulsion polymerization is possible (0 to 55° C.), but polymerization at a temperature in the range of 30 to 50° C. is preferable. It is thus possible to increase the stability in flexibility of the immersion-molded article obtained over time.

The polymerization rate of the chloroprene latex is preferably 60 to 95%, more preferably 80 to 90%. A polymerization rate of less than 60% may lead to deterioration in the solid matter content of the polymer latex, which in turn leads to deterioration in productivity. Alternatively, a polymerization rate of more than 95% may lead to elongation of the polymerization time, thus decrease in productivity and also deterioration in mechanical strength and increase in brittleness of the immersion-molded article when produced.

The terminator used for termination of polymerization is not particularly limited and any one of commonly used terminators may be used. Specifically, phenothiazine, para-t-butylcatechol, hydroquinone, hydroquinone monomethylether, diethyl hydroxylamine and the like can be used.

Preferably in the method of producing the composition in the present embodiment, the polymerization is initiated with the initial addition amount of the monomer adjusted to 10 to 50 mass % of the total monomer, and the remaining monomer, which is cooled to a temperature lower than the polymerization temperature, is added to the polymerization system continuously during the period from the time when the monomer conversion rate is 1 to 40% to the time when the polymerization reaches the final polymerization conversion rate. It is thus possible to remove the heat generated in the polymerization system effectively and carry out the polymerization reaction reliably in a short period of time.

Then, an alkyldiphenyletherdisulfonic acid alkali-metal salt in an amount of 0.01 to 1.0 part by mass with respect to 100 parts by mass of the polychloroprene latex was added to the polychloroprene latex obtained, to give a polychloroprene latex composition in the present embodiment. The time of addition of the alkyldiphenyletherdisulfonic acid alkali-metal salt is not particularly limited, and may be before, during or after the emulsion polymerization.

When the alkyldiphenyletherdisulfonic acid is added before emulsion polymerization, the addition amount is preferably 0.1 to 0.4 time of the addition amount of the rosin acid alkali-metal salt. It is possible in this way to stabilize the polymerization solution and obtain a desired polychloroprene latex composition efficiently.

The chloroprene latex composition in the present embodiment may contain any additives commonly used in rubber latex processing as appropriate. Examples of the additives include other polymers, fillers, antioxidants, metal oxides, curing agents, surfactants and plasticizers.

As described above in detail, the polychloroprene latex composition in the present embodiment, which contains a rosin acid and an alkyldiphenyletherdisulfonic acid, can improve the adhesiveness of the polychloroprene latex composition and the releasability of the molded articles from the mold during immersion molding. In addition, the polychloroprene latex composition in the present embodiment, which provides a polychloroprene latex improved in crystallization resistance, gives an immersion-molded article superior in flexibility.

Further, the polychloroprene latex composition in the present embodiment is favorable for production of immersion-molded articles such as gloves. The method of producing such immersion-molded articles is not particularly limited and any common molding methods can be applied. For example, these articles can be produced, after immersion and coagulation, by leaching (removal of water-soluble impurities), drying and vulcanizing.

EXAMPLES

Hereinafter, the advantageous effects of the present invention will be described specifically with reference to Examples and Comparative Examples. However, it should be understood that the present invention is not restricted by these Examples. Polychloroprene latex compositions in Examples and Comparative Examples were prepared and the properties evaluated by the methods shown below.

Example 1

<Polychloroprene Latex>

100 parts by mass of water, 2.5 parts by mass of a disproportionated rosin acid sodium salt, 0.8 part by mass of potassium hydroxide, 0.8 part by mass of a condensate of sodium naphthalenesulfonate and formaldehyde, and 0.3 part by mass of sodium sulfite were placed in a reactor having a inner capacity of 10 liter under nitrogen stream and, after solubilization of the mixture, 100 parts by mass of chloroprene and 0.14 part by mass of n-dodecylmercaptan were added to the solution under agitation.

The mixture was polymerized using potassium persulfate as the initiator under nitrogen environment at 40° C.; when the polymerization rate reached 90%, an emulsion of phenothiazine was added thereto to terminate the polymerization; and 0.5 part by mass of sodium alkyldiphenyletherdisulfonate was added thereto. Then, unreacted monomers were removed under reduced pressure, to give a polychloroprene latex. The mixture was further concentrated under reduced pressure by vaporization of water, to give a polychloroprene latex having a solid matter content adjusted to 60 mass %.

<Polychloroprene Latex Composition>

The compounds shown in the following Table 1 were added to the polychloroprene latex having a solid matter content of 60 mass % obtained by the method above, to give a polychloroprene latex composition of Example 1.

TABLE 1

| | part by mass |
|---|---|
| CR latex | 100 |
| Zinc white No. 2 | 5 |
| NOCRAC 200 | 2 |
| Sulfur | 1 |
| NOCCELER TET | 1 |
| NOCCELER TP | 1 |
| AQUALEX SMO | 3 |
| AQUALEX WAQ | 1 |

Example 2

The polychloroprene latex composition of Example 2 was prepared by a method and under a condition similar to those in Example 1 described above, except that the addition amounts of the monomers chloroprene and 2,3-dichloro-1,3-butadiene were changed respectively to 95 parts by mass and 5 parts by mass.

Example 3

The polychloroprene latex composition of Example 3 was prepared by a method and under a condition similar to those in Example 1 described above, except that the addition amounts of the monomers chloroprene and 2,3-dichloro-1,3-butadiene were changed respectively to 90 parts by mass and 10 parts by mass.

Example 4

The polychloroprene latex composition of Example 4 was prepared by a method and under a condition similar to those in Example 1 described above, except that the addition amounts of the monomers chloroprene and 2,3-dichloro-1,3-butadiene were changed respectively to 80 parts by mass and 20 parts by mass.

Example 5

The polychloroprene latex composition of Example 5 was prepared by a method and under a condition similar to those in Example 1 described above, except that polymerization is started with the initial addition amounts of the monomers chloroprene, 2,3-dichloro-1,3-butadiene and n-dodecylmercaptan respectively of 27 parts by mass, 3 parts by mass and 0.04 part by mass, and 63 parts by mass of the remaining chloroprene, 7 parts by mass of 2,3-dichloro-1,3-butadiene and 0.1 part by mass of n-dodecylmercaptan, which were previously cooled to −10° C., were started to be added thereto when the polymerization rate reached 10%.

Example 6

The polychloroprene latex composition of Example 6 was prepared by a method and under a condition similar to those in Example 3 described above, except that 0.5 part by mass of sodium alkyldiphenyletherdisulfonate was added before start of polymerization.

Example 7

The polychloroprene latex composition of Example 7 was prepared by a method and under a condition similar to those in Example 6 described above, except that the addition amount of the condensate of sodium naphthalenesulfonate and formaldehyde was 0 part by mass.

Example 8

The polychloroprene latex composition of Example 8 was prepared by a method and under a condition similar to those in Example 3 described above, except that the addition amount of the disproportionated rosin acid sodium salt was 1.5 parts by mass.

Example 9

The polychloroprene latex composition of Example 9 was prepared by a method and under a condition similar to those in Example 3 described above, except that the addition amount of the disproportionated rosin acid sodium salt was 3.0 parts by mass.

Comparative Example 1

The polychloroprene latex composition of Comparative Example 1 was prepared by a method and under a condition similar to those in Example 1 described above, except that no sodium alkyldiphenyletherdisulfonate was used.

Comparative Example 2

The polychloroprene latex composition of Comparative Example 2 was prepared by a method and under a condition similar to those in Example 1 described above, except that 0.5 part by mass of a fatty acid (Vandis M-500-32 (disproportionated tall oil soap) from Harima Chemicals, Inc.) was added, replacing the sodium alkyldiphenyletherdisulfonate.

Comparative Example 3

The polychloroprene latex composition of Comparative Example 3 was prepared by a method and under a condition similar to those in Example 6 described above, except that the addition amount of the sodium salt of the condensate of formaldehyde and naphthalenesulfonic acid was 0 part by mass and the addition amount of sodium alkyldiphenyletherdisulfonate was 1.2 parts by mass.

Comparative Example 4

The polychloroprene latex composition of Comparative Example 4 was prepared by a method and under a condition similar to those in Example 3 described above, except that the addition amount of the disproportionated rosin acid sodium salt was 3.5 parts by mass.

The change in hardness, the blend stability and the physical properties of the film prepared from the blend of each one of the chloroprene latex compositions prepared by the method described in Examples 1 to 9 and Comparative Examples 1 to 4 were evaluated by the methods below.

<Hardness of Dry Film>

A polychloroprene latex obtained was dried in air at room temperature and additionally under vacuum for complete removal of water, to give a dry film. Several sheets of the dry film thus obtained were layered and heated at 70° C. for 15 minutes into a sheet shape with a thickness of 6 mm or more, which was left at room temperature for 1 week. After removal of crystals in the sheet under heat at 70° C. for 20 minutes, the hardness of the sheet after storage at 0° C. for 150 hours was determined. The hardness of the dry film was then determined in accordance with the measuring method with type A durometer, as specified in JIS K6253.

<Film Texture>

The dry film prepared by the method described above was stored at 0° C. for 150 hours, and the change in texture of the film was determined by the change in hardness. A film having a change from the initial hardness of less than 50 was indicated by ⊙, a film having a change of 50 or more and less than 80 by ○, and a film having a change of 80 or more by ×.

<Blend Stability>

Each of the polychloroprene latex compositions obtained in Examples and Comparative Examples was filtered through a 80-mesh wire screen, for determination of the amount of aggregate in the polychloroprene latex composition. The stability of the latex composition was classified into 3 phases by the amount of the aggregate. Specifically, a polychloroprene latex composition having an aggregate amount of less than 0.02 mass % was indicated by ⊙, a composition having an aggregate amount of 0.02 mass % or more and less than 0.5 mass % by ○, and a composition having an aggregate amount of 0.5 mass % or more by ×.

<Strength of Vulcanized Film>

A test sample (vulcanized film) was prepared from each of the polychloroprene latex compositions obtained in Examples and Comparative Examples with the primary flocculant A and the secondary flocculant shown in the following Table 2. The primary flocculant used is a reagent for improvement of the film-forming property of the immersion molding solution and the secondary flocculant is a regent for acceleration of coagulation of the film-shaped immersion molding solution.

TABLE 2

| | Primary flocculant (part by mass) A | Primary flocculant (part by mass) B | Secondary flocculant (part by mass) |
|---|---|---|---|
| Calcium nitrate (tetrahydrate) | 30 | 30 | — |
| Methanol | 70 | 70 | 50 |
| Bentonite | 30 | — | — |
| TERIC 320 | — | 5 | — |
| Acetic acid (20% aqueous solution) | — | — | 50 |

The test sample was prepared by the method below. A test tube having an external diameter of 40 mm and a length of 320 mm was inserted into the primary flocculant to a depth of 150 mm for 10 seconds with the opening facing upward. The test tube was then dried in air for 3 minutes and immersed in the polychloroprene latex composition for 4 minutes, forming an immersion film on the surface of the test tube. The immersion film obtained was subjected to leaching with running water for 1 minute for removal of water-soluble components.

The immersion film after removal of the water-soluble components was immersed additionally in the secondary flocculant for 1 minute and washed with running water for removal of the surface secondary flocculant. The test tube was then dried at 70° C. for 2 hours, to give an unvulcanized film. The unvulcanized film was separated from the test tube, vulcanized at 141° C. for 60 minutes to give a vulcanized film and cut into the No.3 dumbbell shape by the method specified in JIS K6251, to give a test specimen, and the modulus at 300% extension and the breaking strength of the film were determined using a tensile tester (Quick Reader mx) manufactured by Ueshima Seisakusho Co., Ltd.

<Releasability of Vulcanized Film>

A test sample (vulcanized film) was prepared from each of the polychloroprene latex compositions obtained in Examples and Comparative Examples with the primary flocculant B and the secondary flocculant shown in the Table 2. "TERIC320" shown in the Table 2 is a nonionic surfactant of HUNTSMAN Corporation.

Specifically, a glass plate having a width of 80 mm, a length of 150 mm and a thickness of 4 mm was inserted in the primary flocculant to an insertion depth of 100 mm for 10 seconds and dried in air for 3 minutes. Then, it was immersed in the polychloroprene latex composition for 4 minutes, to form an immersion film on the glass plate. The immersion film obtained was subjected to leaching with running water for 1 minute for removal of water-soluble components.

The immersion film after removal of the water-soluble components was immersed additionally in the secondary flocculant for 1 minute, washed with running water for removal of the surface secondary flocculant. It was then dried at 70° C. for 2 hours, to give an unvulcanized film on the glass plate. The film was vulcanized together with the glass plate at 141° C. for 30 minutes, to give a vulcanized film.

The 180° peeling strength of the obtained vulcanized film on the glass plate was determined in accordance with JIS K-6854-2 under the condition of 200 mm/minute by using a Tensilon universal tester (TENSILON RTC-1225A) manufactured by ORIENTEC Co., Ltd. As a result, a film having a 180° peeling strength of less than 0.02 N/mm was indicated by ⊙, a film having a 180° peeling strength of 0.02 N/mm or more and less than 0.05 N/mm by ○, and a film having a 180° peeling strength of 0.05 N/mm or more by ×.

<Adhesiveness of Vulcanized Film>

A test sample (vulcanized film) was prepared from each of the polychloroprene latex compositions obtained in Examples and Comparative Examples with the primary flocculant B and the secondary flocculant shown in the Table 2. Specifically, the test tube was inserted into the immersion molding solution under the same condition as the vulcanized film strength test, to give an immersion film formed on the surface of the test tube. The film obtained was subjected to leaching with running water for 1 minute for removal of water-soluble components.

The immersion film after removal of the water-soluble components was immersed additionally in the secondary flocculant for 1 minute and washed with running water for removal of the surface secondary flocculant. It was then dried in air at 70° C. for 2 hours, to give an unvulcanized film. The unvulcanized film was separated from the test tube and vulcanized at 141° C. for 30 minutes, to give a vulcanized film. Two sheets of the vulcanized film obtained were thermally bonded to each other at 70° C., to give a test sample.

The adhesiveness of the film was classified into 3 phases, as the test sample was evaluated by the type-T peel test in accordance with JIS K-6854-3 under the condition of 200 mm/min by using Tensilon universal tester (TENSILON RTC-1225A) manufactured by ORIENTEC Co., Ltd. A film having a type-T peeling strength of less than 0.02 N/mm was indicated by ⊙, a film having a type-T peeling strength of 0.02 N/mm or more and less than 0.05 N/mm by ○, and a film having a type-T peeling strength of 0.05 N/mm or more by ×.

The evaluation results above are summarized in the following Tables 3 and 4.

TABLE 3

| | | | | Example 1 | Example 2 | Example 3 | Example 4 | Example 5 | Example 6 | Example 7 |
|---|---|---|---|---|---|---|---|---|---|---|
| Polymerization condition | Monomer (CP/DC) | Before polymerization | | 100/0 | 95/5 | 90/10 | 80/20 | 27/3 | 90/10 | 90/10 |
| | | During polymerization | | — | — | — | — | 63/7 | — | — |
| | Soap/assistant | Rosin acid | | 2.5 | 2.5 | 2.5 | 2.5 | 2.5 | 2.5 | 2.5 |
| | | Before polymerization | Surfactant 1 | — | — | — | — | — | 0.5 | 0.5 |
| | | | Surfactant 2 | 0.8 | 0.8 | 0.8 | 0.8 | 0.8 | 0.8 | — |
| | | After polymerization | Surfactant 1 | 0.5 | 0.5 | 0.5 | 0.5 | 0.5 | — | — |
| | | | Fatty acid | — | — | — | — | — | — | — |
| | Polymerization time (min) | | | 340 | 335 | 325 | 335 | 275 | 315 | 345 |
| Physical properties of dried film | Texture | | | ○ | ⊚ | ⊚ | ⊚ | ⊚ | ⊚ | ⊚ |
| | Film hardness | 0° C. × 0 hr | | 26 | 35 | 34 | 36 | 33 | 35 | 37 |
| | | 0° C. × 150 hr | | 84 | 63 | 45 | 45 | 47 | 46 | 46 |

TABLE 3-continued

| | | | Example 1 | Example 2 | Example 3 | Example 4 | Example 5 | Example 6 | Example 7 |
|---|---|---|---|---|---|---|---|---|---|
| Latex blend | | Blend stability | ◎ | ◎ | ◎ | ◎ | ◎ | ◎ | ◎ |
| | | Aggregate (#80) (%) | 0.006 | 0.007 | 0.008 | 0.007 | 0.006 | 0.007 | 0.009 |
| Physical properties of vulcanized film | | Appearance of film | ◎ | ◎ | ◎ | ◎ | ◎ | ◎ | ◎ |
| | | Strength of film | ○ | ○ | ◎ | ○ | ◎ | ◎ | ○ |
| | Tensile properties | Modulus at 300% elongation (MPa) | 1.60 | 1.22 | 1.16 | 1.23 | 1.17 | 1.14 | 1.16 |
| | | Breaking strength (MPa) | 20.5 | 20.2 | 21.9 | 20.0 | 22.4 | 21.8 | 20.3 |
| | | Releasability | ◎ | ◎ | ◎ | ◎ | ◎ | ◎ | ◎ |
| | Film adhesion | Glass/film | ◎ | ◎ | ◎ | ◎ | ◎ | ◎ | ◎ |
| | | Film/film | ◎ | ◎ | ◎ | ◎ | ◎ | ◎ | ◎ |

TABLE 4

| | | | | Example 8 | Example 9 | Comparative Example 1 | Comparative Example 2 | Comparative Example 3 | Comparative Example 4 |
|---|---|---|---|---|---|---|---|---|---|
| Polymerization condition | Monomer (CP/DC) | Before polymerization | | 90/10 | 90/10 | 100/0 | 100/0 | 100/0 | 100/0 |
| | | During polymerization | | — | — | — | — | — | — |
| | Soap/assistant | Rosin acid | | 1.5 | 3.0 | 2.5 | 2.5 | 2.5 | 3.5 |
| | | Before polymerization | Surfactant 1 | — | — | — | — | 1.2 | — |
| | | | Surfactant 2 | 0.8 | 0.8 | 0.8 | 0.8 | — | 0.8 |
| | | After polymerization | Surfactant 1 | 0.5 | 0.5 | — | — | — | 0.5 |
| | | | Fatty acid | — | — | — | 0.5 | — | — |
| | Polymerization time (min) | | | 345 | 320 | 335 | 340 | 320 | 315 |
| Physical properties of dried film | | Texture | | ◎ | ◎ | ○ | ○ | ○ | ○ |
| | | Film hardness | 0° C. × 0 hr | 36 | 34 | 25 | 24 | 27 | 24 |
| | | | 0° C. × 150 hr | 47 | 44 | 85 | 81 | 83 | 80 |
| Latex blend | | Blend stability | | ◎ | ◎ | X | ○ | ◎ | ◎ |
| | | Aggregate (#80) (%) | | 0.012 | 0.004 | 1.093 | 0.025 | 0.004 | 0.006 |
| Physical properties of vulcanized film | | Appearance of film | | ◎ | ◎ | —* | X | X | ○ |
| | | Strength of film | | ◎ | ◎ | —* | —** | —** | ◎ |
| | Tensile properties | Modulus at 300% elongation (MPa) | | 1.15 | 1.17 | —* | —** | —** | 1.59 |
| | | Breaking strength (MPa) | | 21.2 | 22.8 | —* | —** | —** | 21.4 |
| | | Releasability | | ◎ | ○ | —* | —** | —** | X |
| | Film adhesion | Glass/film | | ◎ | ○ | —* | —** | —** | X |
| | | Film/film | | ◎ | ○ | —* | —** | —** | X |

The surfactant 1 shown in Tables 3 and 4 above is an alkyldiphenyletherdisulfonic acid, and the surfactant 2 is a condensate of sodium naphthalenesulfonate and formaldehyde. The positions indicated by * in the evaluation result column are those where the evaluation was not possible because there were many aggregate when the polychloroprene latex composition was blended. Alternatively, the positions indicated by ** are those where evaluation was not possible because no homogeneous film was obtained.

As shown in Table 4 above, the polychloroprene latex composition of Comparative Example 1 gave aggregates when blended and thus, the tests thereafter were not carried out. In addition, the polychloroprene latex composition of Comparative Example 2 caused a problem of blooming of the fatty acid on the film surface and thus, the tests thereafter were not carried out. Further, the polychloroprene latex composition of Comparative Example 3 did not coagulate sufficiently, prohibiting preparation of a uniform film and thus, the tests thereafter were not carried out. Furthermore, the polychloroprene latex composition of Comparative Example 4 gave a film higher in adhesive power, making the film less easily separated from the mold.

In contrast, the polychloroprene latex compositions of Examples 1 to 9, which were prepared within the scope of the present invention, showed favorable properties in all items analyzed. The results show that it is possible according to the present invention to obtain an immersion-molded article superior in mold releasability and also in flexibility. In particular, the polychloroprene latex compositions of Examples 3, 5, 6 and 8, which were prepared by copolymerization with 2,3-dichloro-1,3-butadiene (DC) in an amount of 1 to 30 mass % with respect to 100 mass % of all monomers, gave immersion-molded articles higher in film strength.

The invention claimed is:

1. A polychloroprene latex composition, comprising:

100 parts by mass of a polychloroprene latex obtained by emulsion polymerization of the monomer in the presence of a rosin acid alkali-metal salt in an amount of 3 parts or less by mass with respect to 100 parts by mass of the monomer; and 0.01 to 1.0 part by mass of an alkyldiphenyletherdisulfonic acid alkali-metal salt.

2. The polychloroprene latex composition according to claim 1, wherein 1 to 30 mass % of 2,3-dichloro-1,3-butadiene is contained in 100 parts by mass of the monomer.

3. A method of producing a polychloroprene latex composition, comprising obtaining a polychloroprene latex containing 0.01 to 1.0 part by mass of an alkyldiphenyletherdisulfonic acid alkali-metal salt with respect to 100 parts by mass of the polychloroprene latex, by emulsion polymerization of the monomer in the presence of a rosin acid alkali-metal salt and the alkyldiphenyletherdisulfonic acid alkali-metal salt each in an amount of 3 parts or less by mass with 100 parts by mass of the monomer.

4. A method of producing a polychloroprene latex composition, comprising emulsion-polymerizing the monomer by using a rosin acid alkali-metal salt as emulsifier in an amount of 3 parts or less by mass with respect to 100 parts by mass of the monomer and adding an alkyldiphenyletherdisulfonic acid alkali-metal salt in an amount of 0.01 to 1.0 part by mass with respect to 100 parts by mass of the polychloroprene latex.

5. The method of producing a polychloroprene latex composition according to claim 3, wherein the emulsion polymerization is initiated with an initial addition amount of the monomer adjusted to 10 to 50 mass % of the total monomer, and the remaining monomer, which is cooled to a temperature lower than the polymerization temperature, is added to the polymerization system continuously during the period from the time when the monomer conversion rate is 1 to 40% to the time when the polymerization reaches a final polymerization conversion rate.

6. An immersion-molded article, prepared by immersion molding of the polychloroprene latex composition according to claim 1.

7. The immersion-molded article according to claim 6, being gloves.

8. The method of producing a polychloroprene latex composition according to claim 4, wherein the emulsion polymerization is initiated with an initial addition amount of the monomer adjusted to 10 to 50 mass % of the total monomer, and the remaining monomer, which is cooled to a temperature lower than the polymerization temperature, is added to the polymerization system continuously during the period from the time when the monomer conversion rate is 1 to 40% to the time when the polymerization reaches a final polymerization conversion rate.

* * * * *